US008291035B2

(12) United States Patent
Marcinkowski

(10) Patent No.: US 8,291,035 B2
(45) Date of Patent: Oct. 16, 2012

(54) SYSTEM AND METHOD FOR USING COMMON COMMUNICATION CHANNEL BY WEB PAGE APPLETS

(75) Inventor: Tom Voytek Marcinkowski, Naperville, IL (US)

(73) Assignee: CA, Inc., Islandia, NY (US)

( * ) Notice: Subject to any disclaimer, the term of this patent is extended or adjusted under 35 U.S.C. 154(b) by 2591 days.

(21) Appl. No.: 10/889,239

(22) Filed: Jul. 12, 2004

(65) Prior Publication Data

US 2005/0132085 A1 Jun. 16, 2005

Related U.S. Application Data

(60) Provisional application No. 60/487,037, filed on Jul. 11, 2003.

(51) Int. Cl.
G06F 15/16 (2006.01)
(52) U.S. Cl. ........ 709/217; 709/201; 709/218; 709/219; 709/226; 709/227; 709/232
(58) Field of Classification Search .......... 709/217–219, 709/226, 232, 201, 227
See application file for complete search history.

(56) References Cited

U.S. PATENT DOCUMENTS

| | | | | |
|---|---|---|---|---|
| 5,922,044 | A | 7/1999 | Banthia | 709/203 |
| 5,951,636 | A | 9/1999 | Zerber | 709/202 |
| 6,032,150 | A * | 2/2000 | Nguyen | 707/102 |
| 6,175,877 | B1 | 1/2001 | Zerber | 709/310 |
| 6,225,993 | B1 * | 5/2001 | Lindblad et al. | 715/716 |
| 6,253,228 | B1 | 6/2001 | Ferris et al. | 709/203 |
| 2003/0140089 | A1 * | 7/2003 | Hines et al. | 709/202 |
| 2004/0166798 | A1 * | 8/2004 | Shusman | 455/2.01 |

FOREIGN PATENT DOCUMENTS

WO   WO 98/43170   10/1998

OTHER PUBLICATIONS

EPO Supplementary Search Report under Article 157(2)(a) EPC; Reference HCD/J00048453EP; Application No./Patent No. 04777949.1-1243 PCT/US2004022174, Nov. 16, 2007.
Notification of Transmittal of the International Search Report and the Written Opinion of the International Searching Authority, or the Declaration; International application No. PCT/US04/22174, Nov. 15, 2004.
Odaci, A. et al. "Smart-TPA Java Concepts Validation Report, Version 2.1", Sep. 6, 1999.
Ciancarini, P. et al. "Coordinating Distributed Applets with Shade/Java", ACM, 1998.
Coulouris, George et al. "Distributed Systems Concepts and Design, Second Edition", Addison Wesley Publishers Ltd., 1994.

* cited by examiner

Primary Examiner — Liangche A Wang
(74) Attorney, Agent, or Firm — Baker Botts L.L.P.

(57) ABSTRACT

Methods, apparatus, systems and computer-readable media are disclosed for facilitating multiple applets of a web page to communicate with a back end server through a common communication channel. According to one aspect, a method is disclosed for communicating data which includes identifying a common communication applet by a plurality of client applets. The method also includes submitting a set or data requests originating from the client applets to the common communication applet. The method further includes accumulating the data requests received from the plurality of client applets. The data requests are encoded and transmitted to a back-end handler. Results from the back end server are received, decoded and delivered to the appropriate client applet.

6 Claims, 7 Drawing Sheets

SYSTEM AND METHOD FOR USING COMMON COMMUNICATION CHANNEL BY WEB PAGE APPLETS

CROSS REFERENCE TO RELATED APPLICATIONS

This application claims priority to and incorporates by reference the entirety of U.S. provisional application entitled "System and Method for Using Common Communication Channel by Web Page Applets," Ser. No. 60/487,037, filed Jul. 11, 2003.

TECHNICAL FIELD

The present application generally relates to web-page architecture. The present application more specifically relates to client/server communication techniques between web-page processes, such as applets.

BACKGROUND

Web pages are a widely recognized and well known communication mechanism. The functionality of web pages has been increasing since they were first introduced in the late 1980's. Typically, web pages are documents written according to certain standardized rules which enable content to be displayed by a browser application programmed to apply the standardized rules. Examples of standardized rules governing the display of a web page include Hypertext Markup Language ("HTML"), Extensible Hypertext Markup Language ("XML") and Dynamic Hypertext Markup Language ("DHTML"). Web pages in these and other languages may employ processes to increase the functionality of such web pages. Such processes, also referred to herein as "applets", may be employed to dynamically display content for a web page, communicate with a back-end server, or provide an improved user interface, for example.

A typical environment of an HTML page usually includes a set of loosely related or independent components. In such an environment, it may be difficult to establish workable relationships to facilitate cooperative communication among and between various applets or processes included in the web page. At least one factor impeding the establishment of workable communications is the applet identification mechanism in the runtime environments which relies on the ability of the Java applet to "look around" and detect the presence of other applets. Specifically, when a communication channel is to be shared among applets, the participating "client applets" must be able to find the common communication agent, through which they place data requests and receive responses. While the "look around" mechanism is commonly known, it is difficult to use because of certain problems arising from inconsistent implementations of the Java Virtual Machine between different vendors.

Such applet identification may be difficult under the prior art, at least in part, because the standardized applet identification/enumeration mechanism existing in the Java language, namely AppletContext.getApplets, may return any applet subset ranging from the applets found on the current html page to all applets known to the Java runtime engine. Similarly, a communication applet may face difficulties in locating the client applet to which it has to convey the received data.

Accordingly, there is a need for methods and systems which overcome the difficulties associated with client applets identifying a communication applet with which to place their data requests. Specifically, there is a need for methods and systems which enable reliable applet identification, thus facilitating the ability of Java applets to locate other Java applets on an HTML page. A further need exists for methods and systems which allow a communication applet to identify client applets when results have been received from a server and are ready to be delivered to the requesting client applet.

SUMMARY

The following presents a simplified summary of methods, apparatus, systems, and computer readable media associated with using a common communication channel by web page applets in accordance with the present application. This summary is not an extensive overview and is not intended to identify key or critical elements of the methods, apparatus, systems, and/or media or to delineate the scope of the methods, apparatus, systems, and media. It conceptually identifies the methods, apparatus, systems, and media in a simplified form as a prelude to the more detailed description that is presented later.

In accordance with one aspect of the present application, an exemplary method is disclosed for communicating data. The method includes identifying a common communication applet by a plurality of client applets. Each client applet submits at least one data request to the common communication applet. The common communication applet accumulates the data requests received from the plurality of client applets. The method also includes encoding and transmitting the data requests to a back-end handler, and receiving and decoding results from the back-end handler. The method further includes delivering to each of the plurality of client applets, a result associated with the client applet.

In accordance with a second aspect of the present application, an exemplary method for providing a web page is disclosed. The method includes receiving a request from a web browser for a web page which employs a plurality of applets. The method also includes assigning an applet identifier to each of the plurality of applets. The method further includes assigning a communication group identifier to a communication applet. The communication applet is operative to process communications with the web page. The method still further includes configuring the web page to utilize the plurality of applet identifiers and the communication group identifier, and transmitting the configured web page to the web browser.

In accordance with a third aspect of the present application, an exemplary method for communicating with a web page is disclosed. The method includes receiving an encoded packet representing a plurality of data requests originating from a plurality of client applets associated with a web page. The method also includes decoding the encoded packet to obtain the plurality of data requests. The method further includes processing the plurality of data requests to obtain a plurality of replies, each reply associated with one of the plurality of data requests, and encoding the plurality of replies to obtain an encoded reply packet. In addition, the method includes transmitting the encoded reply packet to a communication applet associated with the web page.

In accordance with a fourth aspect of the present application, an exemplary apparatus is disclosed for communicating data. The apparatus includes a processor and a memory connected to the processor. The memory stores a program to control the operation of the processor. The processor is operative with the program in the memory to identify a common communication applet by a plurality of client applets, and submit a data request from each of the plurality of client applets to the common communication applet.

The processor is further operative with the program in the memory to accumulate the received data requests, and encode and transmit the accumulated data requests to a back-end handler. The apparatus receives and decodes results from the back-end handler, and delivers to each of the plurality of client applets, a result associated with the client applet.

In accordance with a fifth aspect of the present application, an exemplary apparatus is disclosed for providing a web page. The apparatus includes a processor and a memory connected to the processor. The memory stores a program to control the operation of the processor. The processor is operative with the program in the memory to receive a request from a web browser for a web page. The web page employs a plurality of applets. The processor is further operative with the program in the memory to assign an applet identifier to each of the plurality of applets, and assign a communication group identifier to a communication applet. The communication applet processes communications with the web page. The processor is further operative with the program in the memory to configure the web page to utilize the plurality of applet identifiers and the communication group identifier, and transmit the configured web page to the web browser.

In accordance with a sixth aspect of the present application, an exemplary apparatus is disclosed for communicating with a web page. The apparatus includes a processor and a memory connected to the processor. The memory stores a program to control the operation of the processor. The processor is operative with the program in the memory to receive an encoded packet representing a plurality of data requests originating from a plurality of client applets associated with a web page. The processor is further operative with the program in the memory to decode the encoded packet to obtain the plurality of data requests, and process the plurality of data requests to obtain a plurality of replies. Each reply is associated with one of the plurality of data requests. The processor is further operative with the program in the memory to encode the plurality of replies to obtain an encoded reply packet, and transmit the encoded reply packet to a communication applet associated with the web page Certain illustrative aspects of the methods, apparatus, systems and computer-readable media are described herein in connection with the following description and the annexed drawings. These aspects are indicative, however, of but a few of the various ways in which the principles of the methods, apparatus, systems, and media may be employed and thus the examples are intended to include such aspects and equivalents. Other advantages and novel features may become apparent from the following detailed description when considered in conjunction with the drawings.

DETAILED DESCRIPTION

Figure 1A:
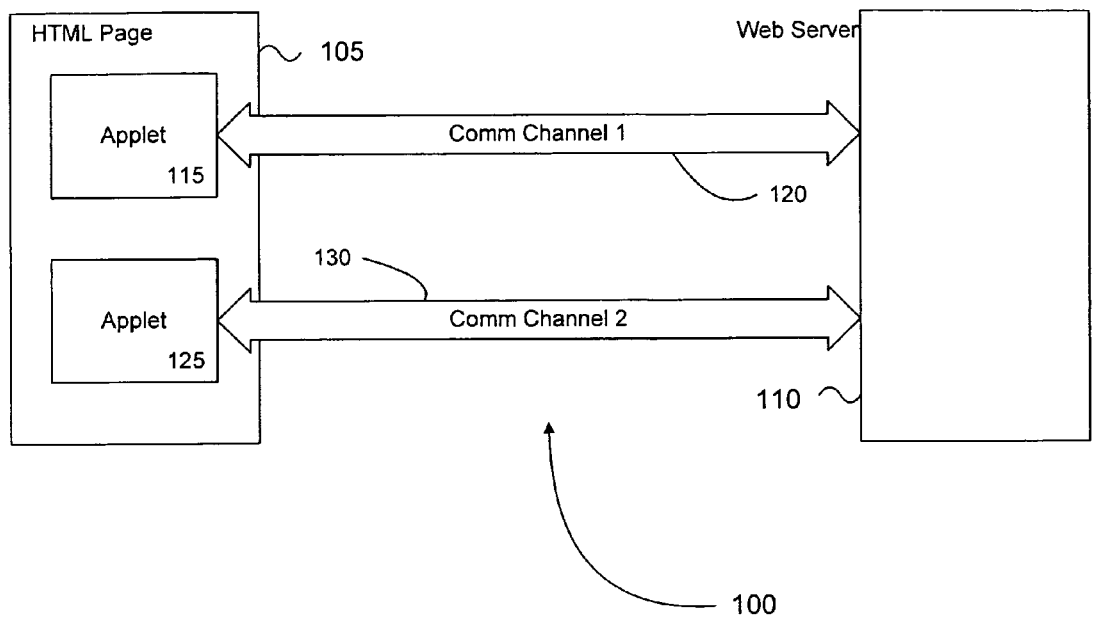
FIG. 1A is a schematic block diagram illustrating an example architecture of a web page employing a separate communication channel for each applet.

Example methods, apparatus, systems and computer-readable media are now described with reference to the drawings, where like reference numerals are used to refer to like elements throughout. In the following description, for purposes of explanation, numerous specific details are set forth in order to facilitate thoroughly understanding the methods and systems. It may be evident, however, that the methods and systems can be practiced without these specific details. In other instances, well-known structures and devices are shown in block diagram form in order to simplify the description.

Referring to FIG. 1A, a schematic block diagram illustrates an example computing environment 100 including a web page 105 in communication with a web server 110. As illustrated, example web page 105 includes a first applet 115 and a second applet 125. Applets 115 and 125 each communicate with web server 110 via independent or separate communication channels 120 and 130, respectively.

Figure 1B:
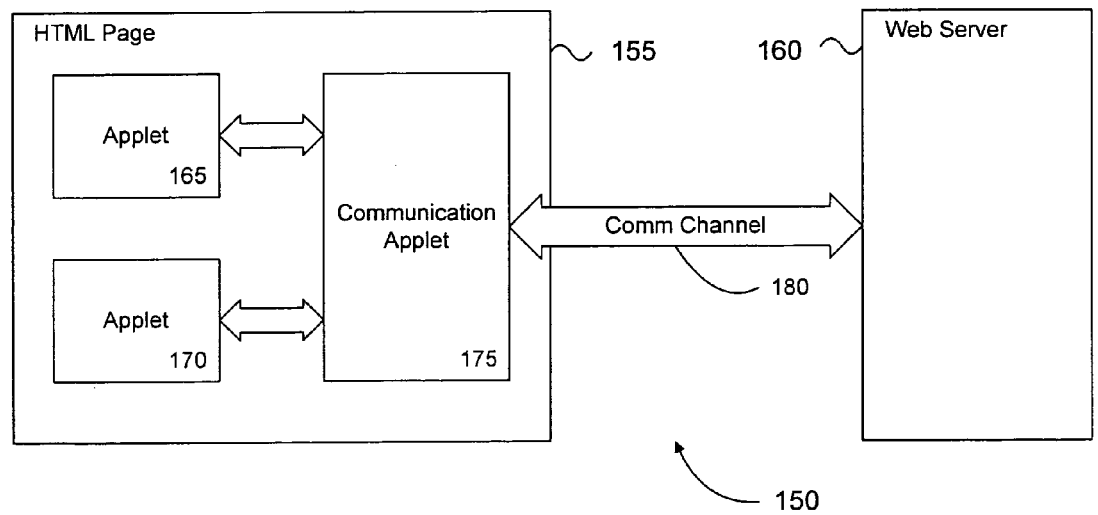
FIG. 1B is a schematic block diagram illustrating an example architecture of a web page employing a common communication channel for all applets.

FIG. 1B is a schematic block diagram illustrating a second example computing environment 150 including a web page 155 in communication with a web server 160. Example web page 155 includes a first applet 165, a second applet 170 and a communication applet 175. Communication applet 175 receives data requests from applets 165 and 170, processes the received data requests into a request packet, and transmits the request packet containing the combined requests from applets 165 and 170 to web server 160.

Upon processing the requests of applets 165 and 170, web server 160 encodes a first reply intended for applet 165 and a second reply intended for applet 170 into a reply packet. Web server 160 transmits the reply packet to communication applet 175 which decodes the packet into separate replies and delivers the replies accordingly to applets 165 and 170.

Figure 2:
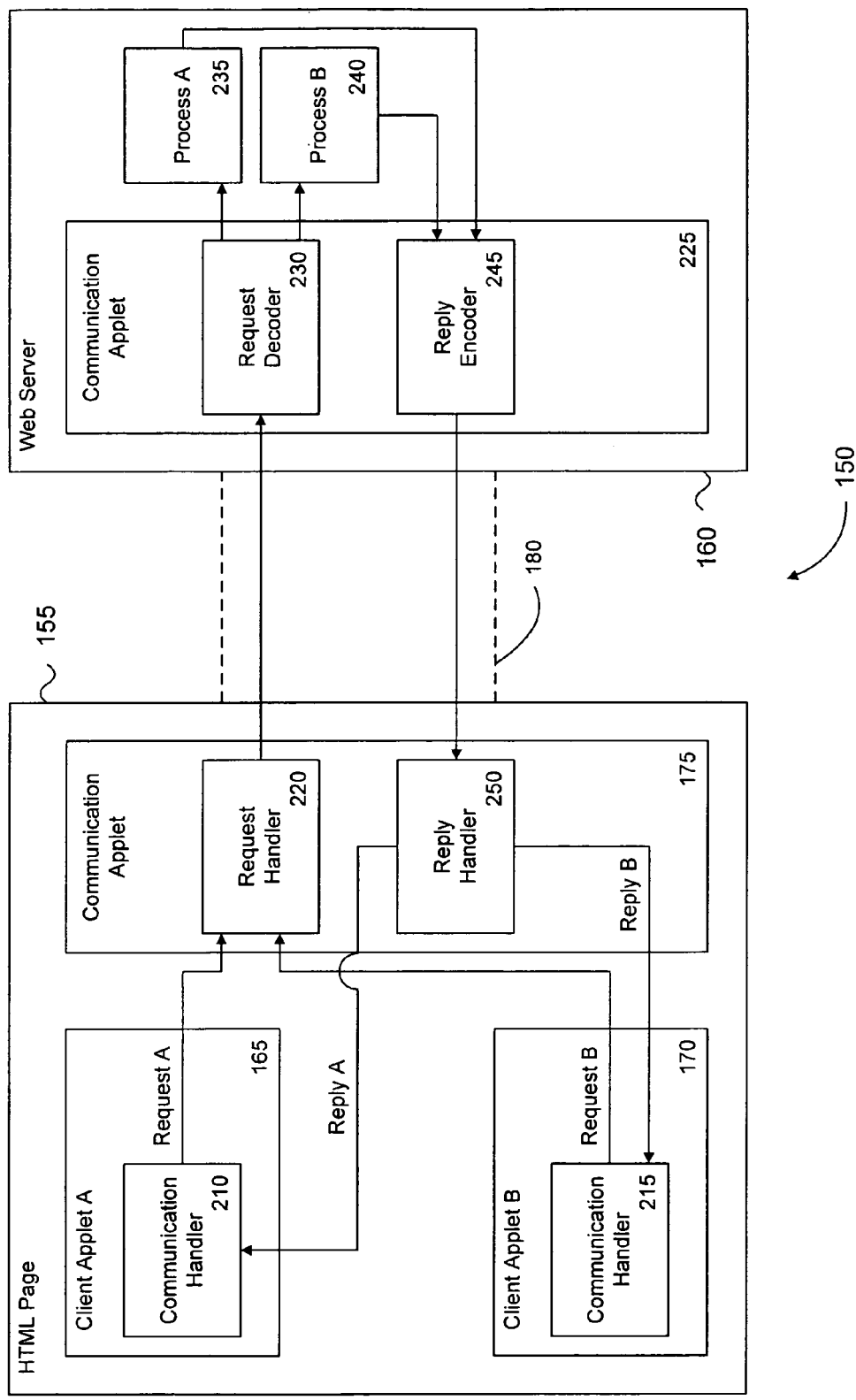
FIG. 2 is a schematic block diagram further illustrating components and data flow of the example web page of FIG. 1B.

Example environment 150 is one embodiment of the present application in which a specific set of HTML design requirements call for a number of applets being placed on a page. Referring now to FIG. 2, a schematic block diagram illustrates in more detail the example environment 150 illustrated in FIG. 1B. Specifically, each client applet 165 and 170 of web page 155 includes a communication 210 and 215, respectively. Each client applet is operative to identify communication applet 175 in order to send and receive data from the web server 160. Communication handlers 210 and 215 operate to deliver data requests to request handler 220 of communication applet 175. Communication handlers 210 and 215 are further operative to receive replies from reply handler 250 of communication applet 175. Communicant applet 175 communicates with each client applet 165 and 170 separately via internal communications means. Communication applet 175 operates as a single point of communication for web page 155 with web server 160.

Request handler 220 is operative to receive and accumulate requests from a plurality of client applets, encode them into a data request packet, and transmit the data request packet to web server 160. Reply handler 250 is operative to receive a reply packet, decode the reply packet into individual replies, and distribute each reply to the appropriate client applet.

As illustrated, request packets and reply packets are transmitted between web page 155 and web server 160 over the common communication channel 180. Communication handler 225 of web server 160 includes a request decoder 230 and a reply encoder 235. Data request packets are received by request decoder 230 which decodes the data request packet into individual requests, and routes the individual data requests to the appropriate process, such as processes 235 and 240, for example. Processes 235 and 240 provide replies to the individual data requests to reply encoder 245 which receives and accumulates replies. Reply encoder further encodes the replies into a reply packet and transmits the reply packet over communication channel 180 to the communication applet 175 of web page 155.

Figure 3:
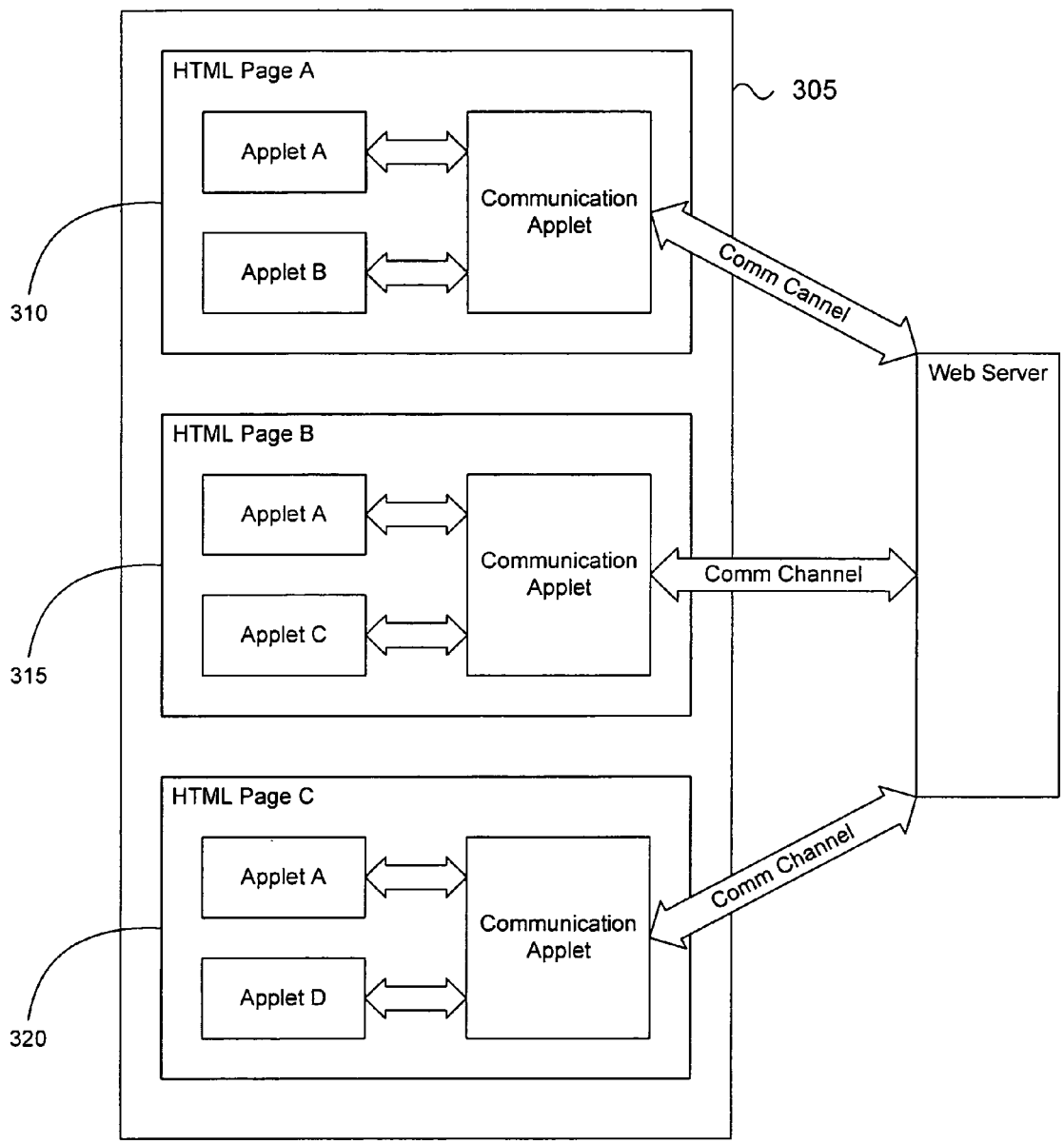
FIG. 3 is a schematic block diagram illustrating an example web browser processing several web pages employing a common communication channel.

Turning now to FIG. 3, there is illustrated an example web browser 305 which is processing several example web pages 310, 315 and 320. Each web page employs the example architecture described with reference to FIGS. 1B and 2. As shown in the diagram, each of the multiple web pages that may be displayed in a browser is provided a Communication Applet. Each Communication Applet provides a common communication channel for all applets of a web page. It should be noted that, as illustrated, the applets contained on any web page may include but are not limited to instances of the same class.

Figure 4:
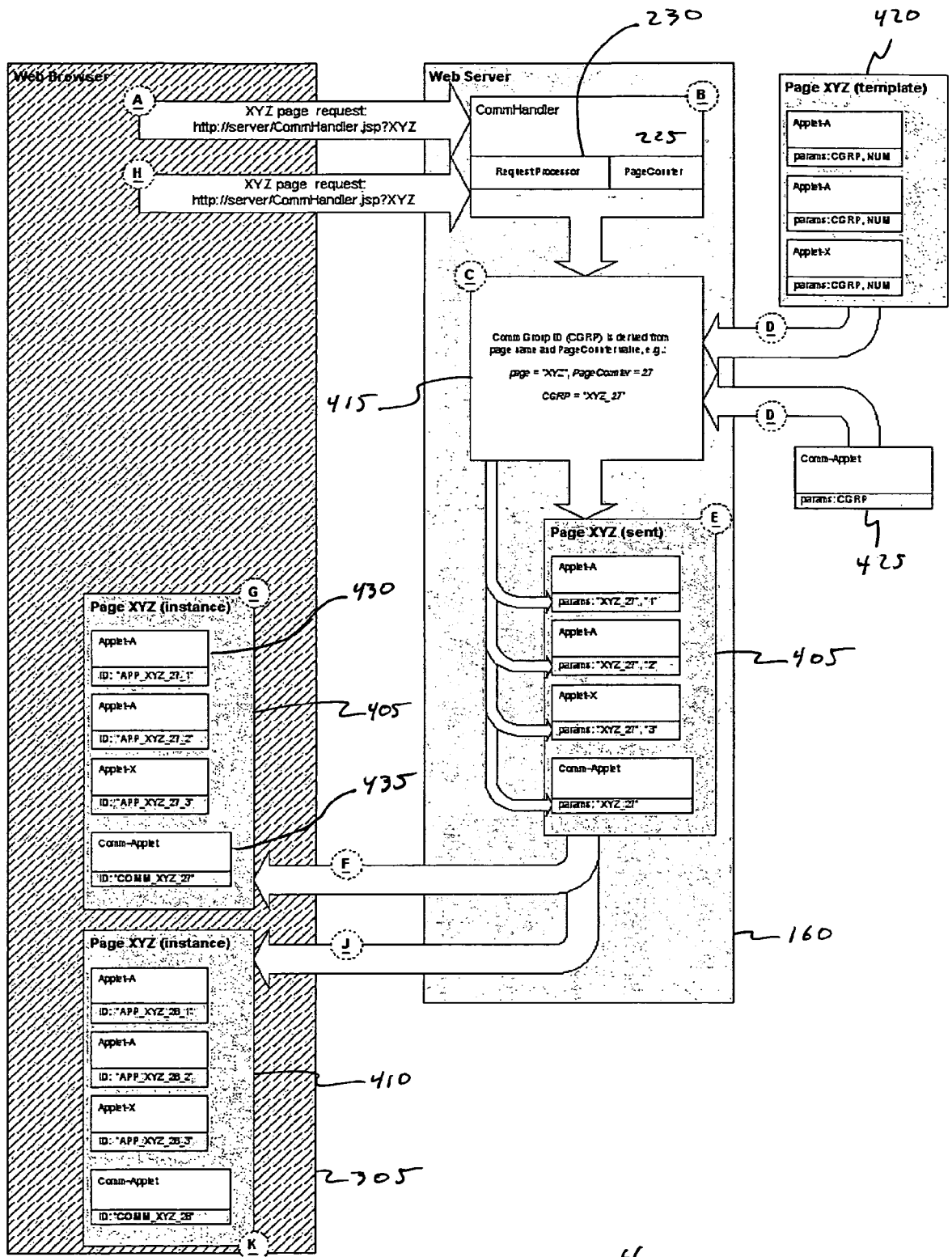
FIG. 4 is a schematic block diagram illustrating a data flow among components during an example applet ID assignment methodology.
Figure 5:
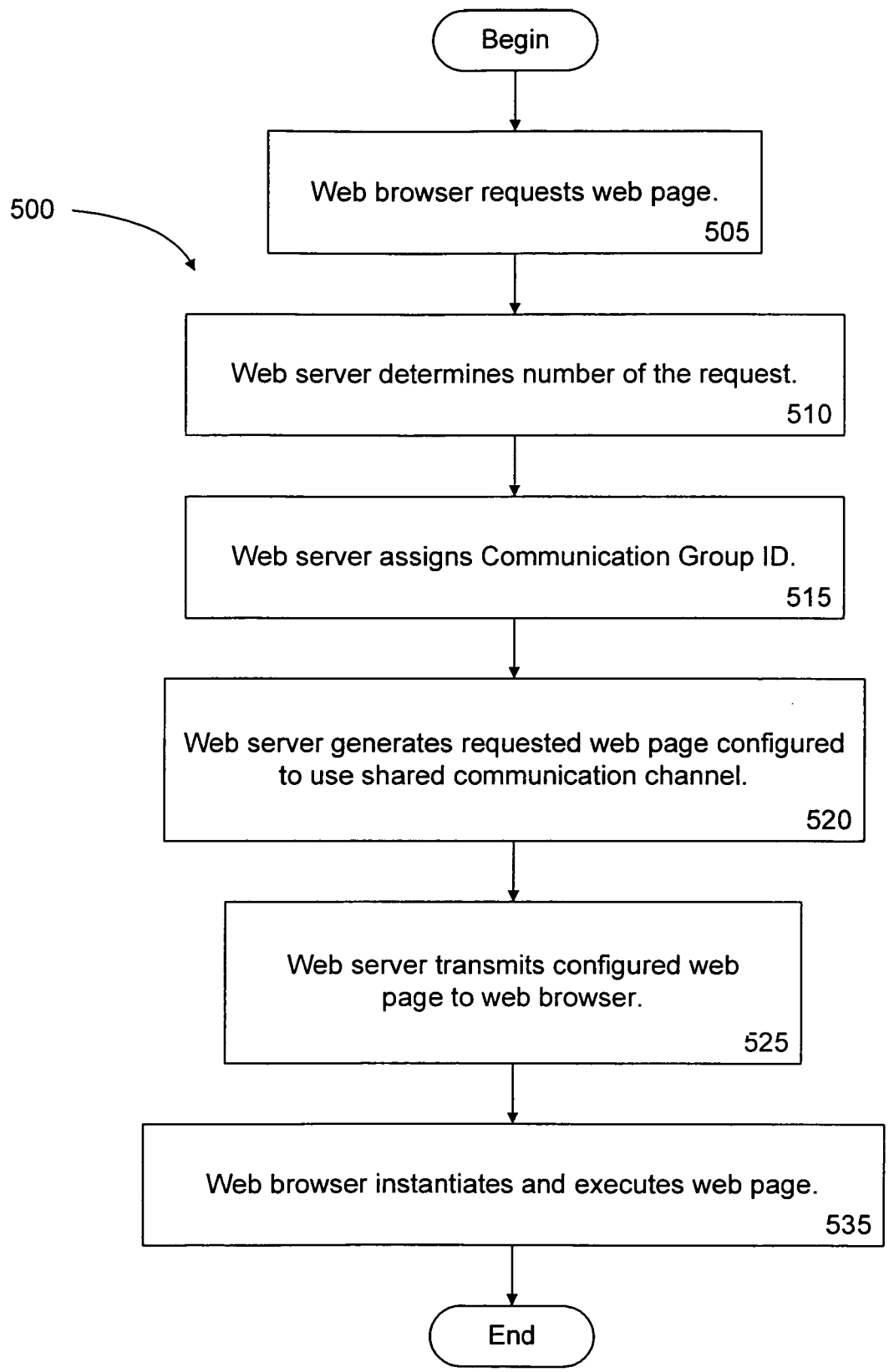
FIG. 5 is a flow chart illustrating an example applet ID assignment methodology.

Referring now to FIGS. 4 and 5, a methodology and data flow of an example Applet ID assignment process is illustrated. As is shown, the example methodology addressing the above described problem of identifying a common communication applet involves the cooperation of the back-end server. In the example, the derived behavior is implemented in the back-end communication handler, although other embodiments in which the behavior is implemented in the web browser may also be possible. The corresponding logic for the front-end applets is enclosed in relatively small library routines.

At block 505, web browser 305 initiates the ID assignment process when it requests an HTML page 405 from web server 160. Communication handler 225 receives the request at web server 160 and employs request decoder 230 to process the received request. Request decoder 230 determines and stores the number of the request based on page counter 225, as illustrated at block 510. The counter is maintained in a thread safe manner.

The request decoder 230, at block 515, then determines a Communication Group ID which is, in the instant example, a unique string associated with the instance of the requested page and the determined page number. The Communication Group ID is constructed and assigned to the page in the way that makes the page unique. Of course, many different Communication Group ID construction schemes are possible. The unique, combined ID elements may include, among other elements: a page counter for uniqueness in one server scenario; a page name for ease of identification; and a server name for uniqueness in a multiple server scenario.

At block 520, the web server 160 services the request for web page 405 by generating the requested, formatted HTML page based on a web page template 420. Web page 405 is then written out to the request output with the modifications enabling the shared communication channel. One such modification is that a Communication Applet is inserted into each page body. Also, each applet on web page 405 is given a unique Communication Group ID parameter, namely the "CGRP" applet parameter. Furthermore, each applet on web page 405 is assigned a number that reflects the applet's order and differentiates the current applet from other applets on the page, such as the Communication Group or "NUM" applet parameter.

As illustrated at blocks 525 and 530, the generated web page 405 is transmitted back to the requesting web browser 305 where it is instantiated and "executed" by the applet runtime environment. FIG. 4 depicts a second consecutive request for a second instance 410 of the same page initiated from the same web browser 305. The second request is processed in the same manner as described with respect to FIG. 5. The second request results in a web page 410 sent back to the web browser 305, which is then instantiated and "executed" by the applet runtime. This illustrates how the present application makes the applets on both pages 405 and 410 distinct and thus identifiable. Specifically, it illustrates a solution to the problem that makes the implementation of the shared communication channel difficult.

Figure 6:
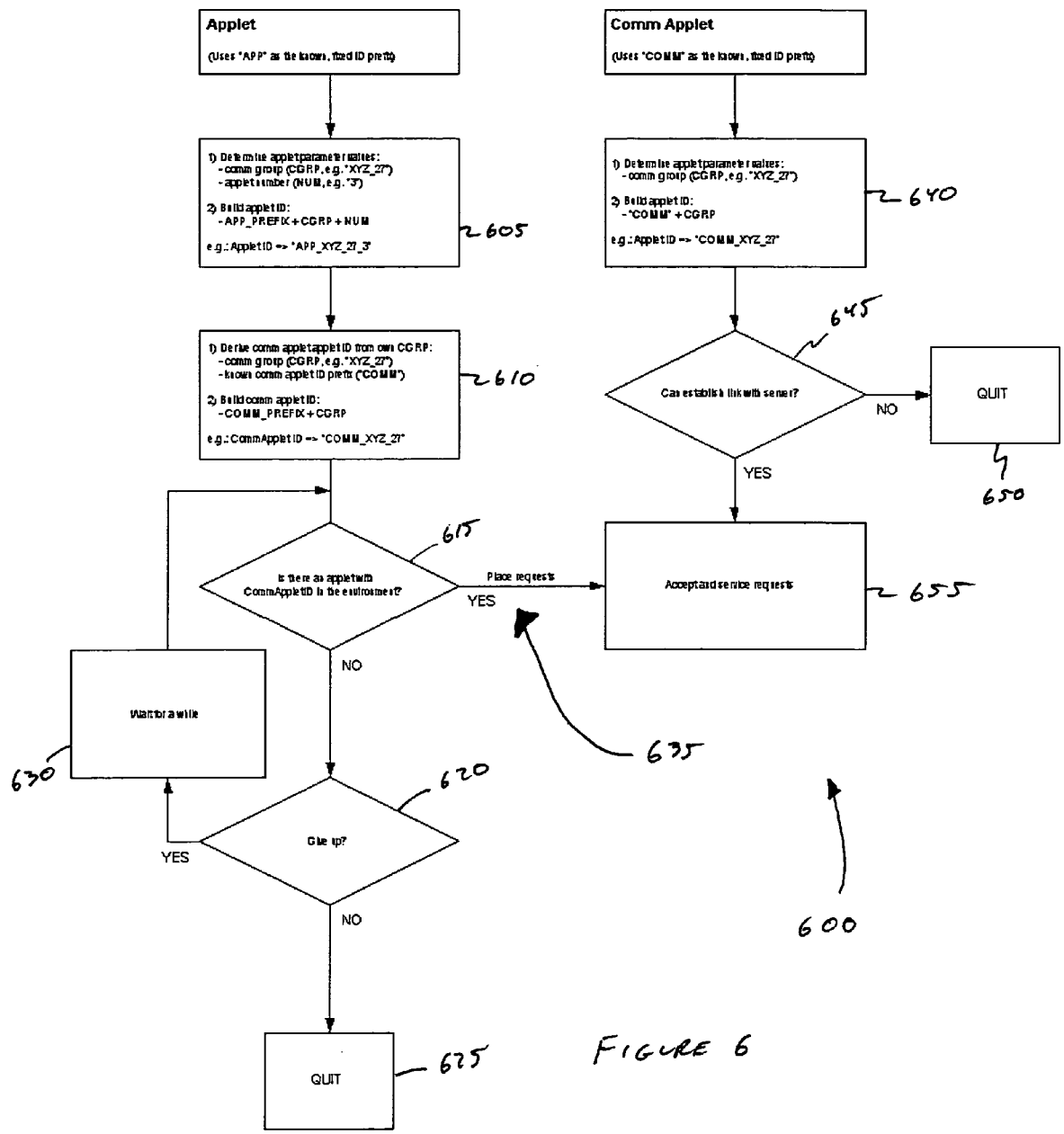
FIG. 6 is a flow chart illustrating an example applet initialization methodology.
Figure 7:
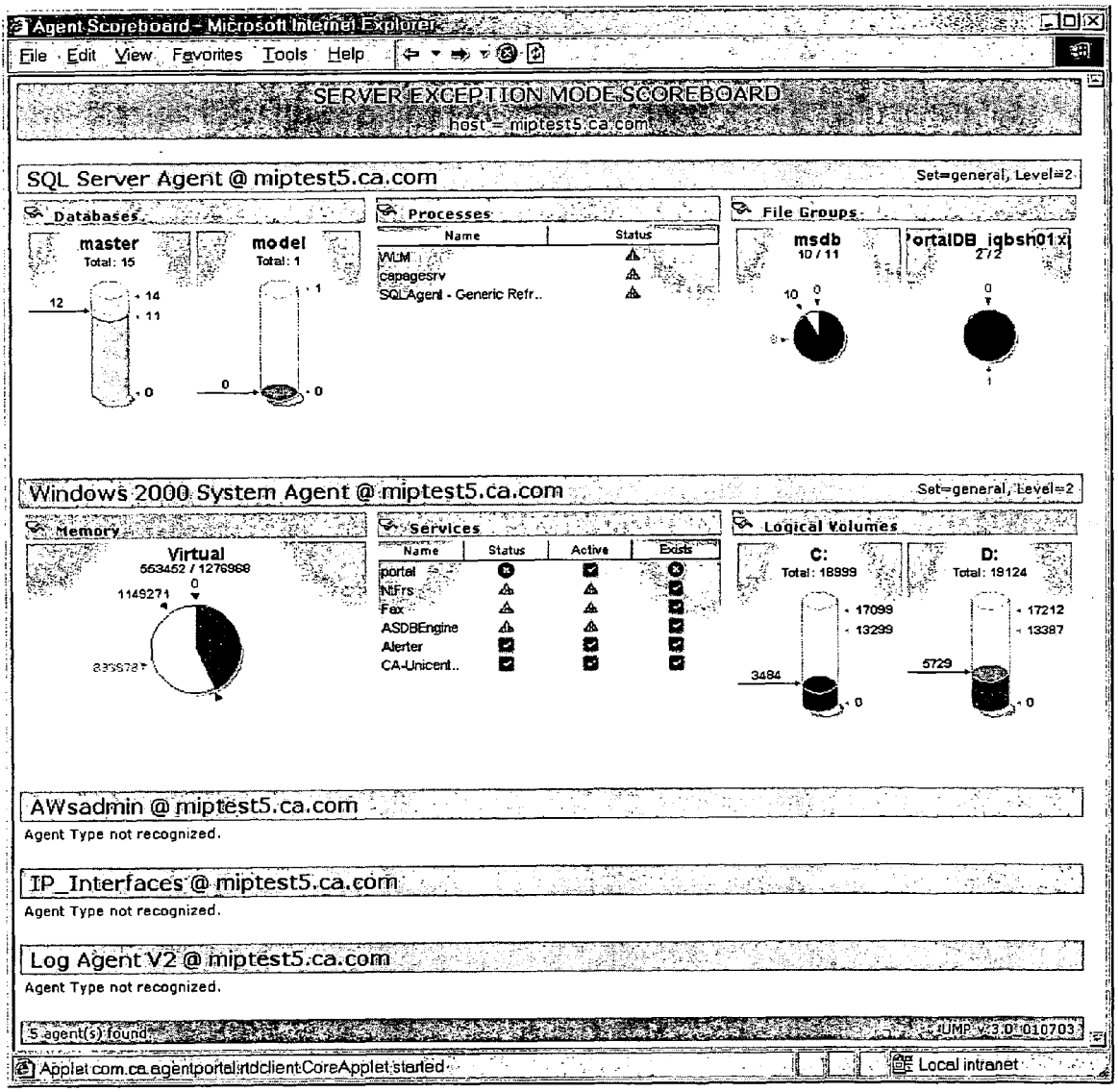
FIG. 7 is a screen display resulting from the methods and systems of the present application.

Referring now to FIG. 6, there is illustrated an example applet startup methodology 600. Once the requested page is instantiated by the web browser 305 and the enhancements described with respect to FIGS. 4 and 5 are added by the communication handle, a client applet may communicate with the web server 160 according to the blocks of methodology 600.

At block 605, a client applet, such as client applet 430, determines its Applet ID based on provided parameters such as, for example, fixed/known client applet prefix, Communication Group ID, and applet sequence number. The applet uses its applet ID to identify itself to an associated communication applet, such as communication applet 435, as a specific request sender. The client applet then determines the ID of the communication applet based on the provided parameters such as, for example, fixed/known communication applet prefix, Communication Group ID, as illustrated at block 610.

At decision block 615, the client applet attempts to find the communication applet in the applet environment by using the Communication Applet ID. As illustrated by blocks 620, 625 and 630, the client applet makes this attempt at regular intervals until it is found or until it is time to give up, such as upon a timeout condition, for example. Upon finding the communication applet, a client applet data request is submitted to the communication applet for transmission to the web server 160.

Prior to accepting service requests from client applets, the communication applet executes a startup procedure that includes blocks 640 and 645. At block 640, the communication applet determines its applet ID based on the provided parameters such as, for example, fixed/known communication applet prefix and the Communication Group ID. The communication applet attempts to establish a link with the back end web server at block 645. Upon completing blocks 640 and 645, the communication applet accepts requests from client applets as illustrated at block 655.

Each reply received by the communication applet from the back end web server includes the applet ID associated with the client applet initiating the request. Using the applet ID passed back to the communication applet from the back end web server, the communication applet is able to route the reply to the appropriate client applet.

It should be noted that, by implementing a known and predictable naming scheme, the devised naming system allows the back end to identify and address any of the front-end applets without the front-end applet initiating the connection. This feature may be used to send messages from the back end to the front end applets that are independent of the responses to the data requests issued by the front-end applets.

The present application, in one illustrative operation, is used by the scoreboard shown in FIG. 6. The depicted Server Exception Mode Scoreboard includes multiple chart applets which use the common communication channel of the present application to retrieve data from the back-end server.

The present application constitutes a system and method for allowing multiple applets placed on the same HTML page to retrieve data from a cooperating back-end server in an efficient manner. This is accomplished by enabling multiple clients, such as procedures, applets or controls, for example, to share the same communication channel rather than creating a separate communication channel for each client. A common channel for web page applets reduces both the required communication channel bandwidth or network load as well as the load on the back-end server.

It is an advantage of the present application that data is retrieved from the back-end server without opening additional server ports other that the usual HTTP port (#80) thereby complying with the commonplace security measures. It is also an advantage of the present application that 3rd-party runtime redistribution problems are avoided. It is a further advantage of the present application that it may be embodied in downloadable "jar" files associated with the JAVA application. Yet a further advantage of the present application is that it presents low overhead in terms of front-end and back-end CPU/memory resources. Still a further advantage of the present invention is that it allows the communication channel to be reused.

The present application describes a unique applet identification or numbering scheme, which makes reliable applet identification possible, thus facilitating the ability of Java applets to locate other Java applets on the html page. For example, a web page contains one or more "client" applets, such as chart display applets, for example. A back-end server has access to the data. An applet in this example has a need for data to be continuously requested and fetched from the back-end and delivered to the html page charts to result in "running charts". Many similar pages exist at the same time, each of them hosting the same or different set of client applets with similar communication needs. The shared communication channel described in the present application allows multiple applets residing on a page to send and receive data to/from the back-end server. The present application includes a "communication applet," which is responsible for the actual data transfer, and a cooperating back-end handler procedure.

What has been described above includes several examples. It is, of course, not possible to describe every conceivable combination of components or methodologies for purposes of describing the systems, apparatus, methods, and computer readable media associated with data communication between applets of a web page and a back end server via a common communication channel. However, one of ordinary skill in the art may recognize that further combinations and permutations are possible. Accordingly, this application is intended to embrace such alterations, modifications, and variations that fall within the scope of the appended claims. Furthermore, to the extent that the term "includes" is employed in the detailed description or the claims, such term is intended to be inclusive in a manner similar to the term "comprising" as that term is interpreted when employed as a transitional word in a claim.

What is claimed is:

1. A method for communicating data, comprising:
   identifying a common communication applet by a plurality of client applets;
   submitting by each client applet at least one data request to the common communication applet;
   accumulating data requests received from the plurality of client applets;
   encoding and transmitting the data requests to at least one back-end handler;
   receiving and decoding results from the at least one back-end handler; and
   delivering to each of the plurality of client applets, a result associated with the client applet.

2. The method of claim 1, further comprising using a predictable naming scheme for creating identifiers for each client applet of the plurality of client applets, the predictable naming scheme allowing the results from the at least one back-end handler to be delivered to each of the plurality of client applets independent of the data requests received from the plurality of client applets.

3. The method of claim 1, wherein identifying a common communication applet by a plurality of client applets comprises identifying a common communication applet by each client applet of the plurality of client applets providing an applet identifier unique to the respective client applet.

4. An apparatus for communicating data, comprising:
   a processor;
   a memory connected to said processor storing a program to control the operation of said processor;
   the processor operative with the program in the memory to:
      identify a common communication applet by a plurality of client applets;
      submit a data request from each of the plurality of client applets to the common communication applet;
      accumulate the received data requests;
      encode and transmit the accumulated data requests to a back-end handler;
      receive and decode results from the back-end handler; and
      deliver to each of the plurality of client applets, a result associated with the client applet.

5. The apparatus of claim 4, wherein the processor is further operative with the program in the memory to use a predictable naming scheme for creating identifiers for each client applet of the plurality of client applets, the predictable naming scheme allowing the results from the at least one back-end handler to be delivered to each of the plurality of client applets independent of the data requests received from the plurality of client applets.

6. The apparatus of claim 4, wherein the processor operative with the program in the memory to identify a common communication applet by a plurality of client applets is further operative with the program in the memory to identify a common communication applet by each client applet of the plurality of client applets providing an applet identifier unique to the respective client applet.

* * * * *